(12) United States Patent
Ito et al.

(10) Patent No.: US 9,912,794 B2
(45) Date of Patent: Mar. 6, 2018

(54) VEHICLE MOBILE TERMINAL MANIPULATION SYSTEM

(71) Applicant: DENSO CORPORATION, Kariya, Aichi-pref. (JP)

(72) Inventors: Masaya Ito, Kariya (JP); Yoshitaka Ozaki, Kariya (JP); Takemi Ueno, Kariya (JP); Daisuke Tamura, Kariya (JP); Kimiaki Tanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/125,244

(22) PCT Filed: Mar. 5, 2015

(86) PCT No.: PCT/JP2015/001166
§ 371 (c)(1),
(2) Date: Sep. 12, 2016

(87) PCT Pub. No.: WO2015/146003
PCT Pub. Date: Oct. 1, 2015

(65) Prior Publication Data
US 2017/0078465 A1    Mar. 16, 2017

(30) Foreign Application Priority Data

Mar. 28, 2014 (JP) ................................. 2014-068794
Sep. 25, 2014 (JP) ................................. 2014-195115

(51) Int. Cl.
*H04M 1/00*     (2006.01)
*H04M 1/60*     (2006.01)
(Continued)

(52) U.S. Cl.
CPC ........... *H04M 1/6075* (2013.01); *B60K 35/00* (2013.01); *G06F 3/0362* (2013.01);
(Continued)

(58) Field of Classification Search
CPC ................. G06F 3/3062; G06F 3/1423; B60K 2350/102; B60K 2350/106;
(Continued)

(56) References Cited

U.S. PATENT DOCUMENTS

2004/0061621 A1   4/2004  Ishida
2008/0133084 A1   6/2008  Weinmann et al.
(Continued)

FOREIGN PATENT DOCUMENTS

JP    H11-154030 A    6/1999
JP    2000-342853 A   12/2000
(Continued)

*Primary Examiner* — Eugene Yun
(74) *Attorney, Agent, or Firm* — Harness, Dickey & Pierce, P.L.C.

(57) ABSTRACT

A vehicle mobile terminal manipulation system that manipulates a mobile terminal brought in a vehicle includes: a mobile terminal; a manipulation device to which a user inputs manipulation; and a notification portion that notifies the mobile terminal of manipulation information indicative of manipulation which has been input to the manipulation device. The mobile terminal includes a terminal-side display portion and a terminal-side manipulation portion. The mobile terminal has a user interface displayed on the terminal-side display portion at a time when independently operating according to manipulation conducted on the terminal-side manipulation portion. The mobile terminal causes the terminal-side display portion to display a user interface different from a case where the mobile terminal independently operates, when operating according to manipulation conducted on the manipulation device different in manipulation mode from the terminal-side manipulation portion of the mobile terminal.

14 Claims, 9 Drawing Sheets

(51) Int. Cl.

| | |
|---|---|
| *B60K 35/00* | (2006.01) |
| *G06F 3/0354* | (2013.01) |
| *G06F 3/0362* | (2013.01) |
| *G06F 3/14* | (2006.01) |
| *G06F 3/16* | (2006.01) |
| *H04M 1/725* | (2006.01) |

(52) U.S. Cl.
CPC ........ *G06F 3/03547* (2013.01); *G06F 3/1423* (2013.01); *G06F 3/167* (2013.01); *H04M 1/6091* (2013.01); *H04M 1/72527* (2013.01); *B60K 2350/102* (2013.01); *B60K 2350/106* (2013.01); *B60K 2350/357* (2013.01)

(58) Field of Classification Search
CPC ............. B60K 2350/357; B60K 35/00; H04M 1/6091; H04M 1/72527; H04M 1/6075
USPC ................................ 455/556.1, 569.2, 575.9
See application file for complete search history.

(56) References Cited

U.S. PATENT DOCUMENTS

| | | |
|---|---|---|
| 2011/0294490 A1 | 12/2011 | Faenger |
| 2014/0038669 A1 | 2/2014 | Shimizu et al. |
| 2014/0083225 A1 | 3/2014 | Downs et al. |

FOREIGN PATENT DOCUMENTS

| | | |
|---|---|---|
| JP | 2004120577 A | 4/2004 |
| JP | 2010129070 A | 6/2010 |
| JP | 2011203982 A | 10/2011 |
| JP | 2012003374 A | 1/2012 |
| JP | 2013171514 A | 9/2013 |
| JP | 2013535123 A | 9/2013 |
| JP | 2013246471 A | 12/2013 |

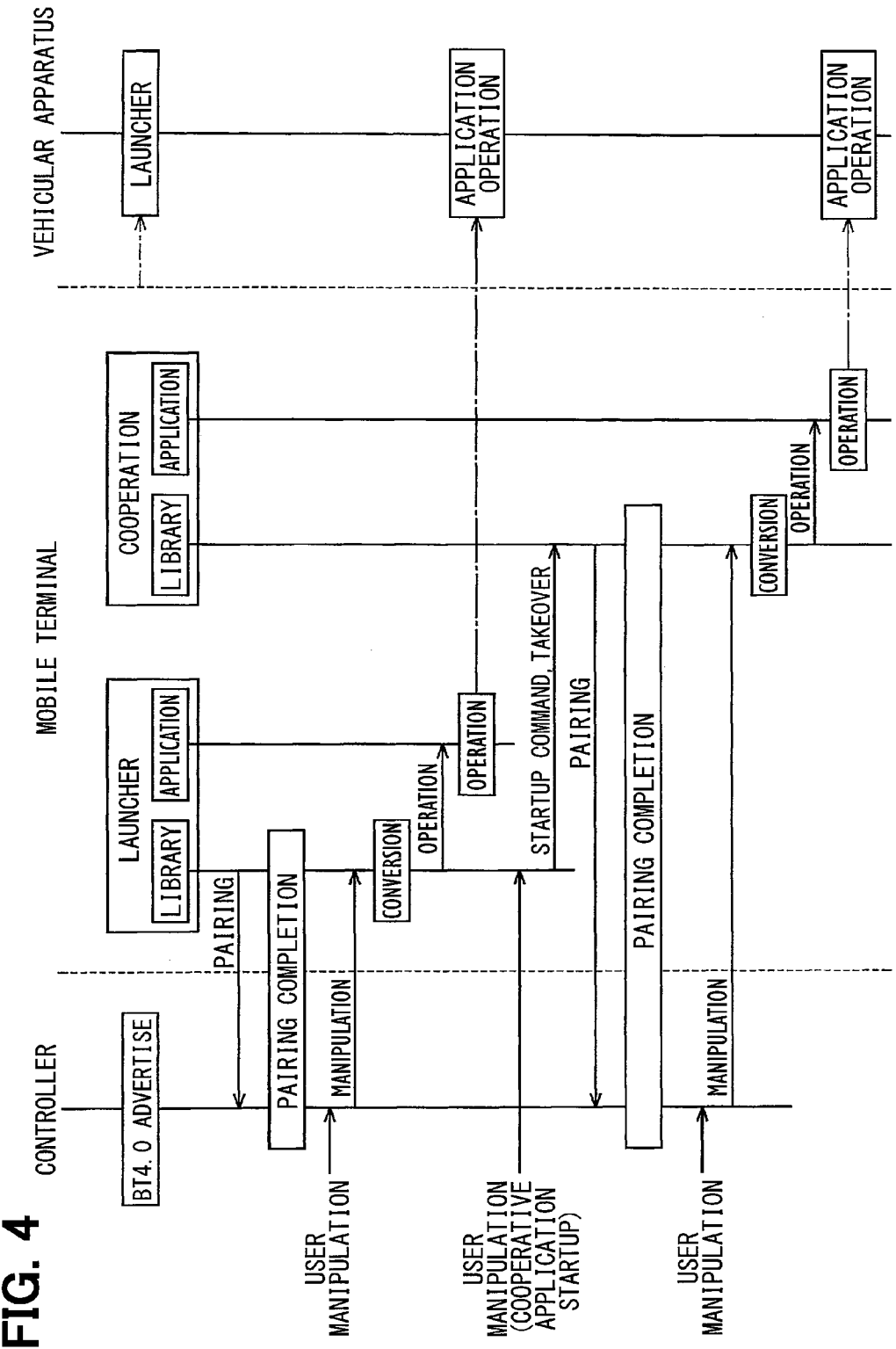

VEHICLE MOBILE TERMINAL MANIPULATION SYSTEM

CROSS REFERENCE TO RELATED APPLICATIONS

This application is a U.S. National Phase Application under 35 U.S.C. 371 of International Application No. PCT/JP2015/001166 filed on Mar. 5, 2015 and published in Japanese as WO 2015/146003 A1 on Oct. 1, 2015. This application is based on and claims the benefit of priority from Japanese Patent Application No. 2014-068794 filed on Mar. 28, 2014 and Japanese Patent Application No. 2014-195115 filed on Sep. 25, 2014. The entire disclosures of all of the above applications are incorporated herein by reference.

TECHNICAL FIELD

The present disclosure relates to a vehicle mobile terminal manipulation system to manipulate a mobile terminal present in a vehicle.

BACKGROUND ART

In recent years, mobile terminals such as smartphones that can execute applications high in convenience when used in vehicles, for example, destination search or route guidance have become widespread. Such mobile terminal is assumed to be used in user's hand, and a user needs to look at a screen to some extent during manipulation of the mobile terminal. However, since the manipulation of the mobile terminal during driving may interfere with the driving, the manipulation while driving is undesirable. For that reason, for example, Patent Literature 1 discloses that an imaging portion for imaging a screen of the mobile terminal is provided, the screen of the mobile terminal is reproduced on a vehicular device side, and manipulation input to the vehicular device is fed back to the mobile terminal.

The inventors of the present application have found the following. In a configuration disclosed in Patent Literature 1, the vehicular device needs to be provided with an imaging portion, and the vehicular device available for the manipulation of the mobile terminal is limited in advance. The mobile terminal-side needs to be compatible with each vehicular device. To perform a manipulation required to watch the screen to some extent such as a touch panel in the vehicle may interfere with the driving, and it is undesirable from the viewpoint of safety.

PRIOR ART LITERATURE

Patent Literature

Patent Literature 1: JP 2012-3374 A

SUMMARY OF INVENTION

It is an object of the present disclosure to provide a vehicle mobile terminal manipulation system capable of reducing a risk that the manipulation of a mobile terminal in a vehicle interferes with driving.

A vehicle mobile terminal manipulation system that manipulates a mobile terminal brought in a vehicle according to one aspect of the present disclosure includes a manipulation device to which manipulation is input, and a notification portion that notifies the mobile terminal of manipulation information indicative of manipulation which has been input to the manipulation device. The mobile terminal operates according to manipulation conducted on a terminal-side manipulation portion of the mobile terminal, and meanwhile operates, based on the manipulation information notified from the manipulation device side, according to manipulation conducted on the manipulation device different in manipulation mode from the terminal-side manipulation portion of the mobile terminal.

With this configuration, even in the application assumed to be input from the touch panel, it may be possible that the mobile terminal is manipulated without watching the screen. Therefore, it may be possible to reduce a risk that the manipulation of the mobile terminal in the vehicle interferes with driving.

BRIEF DESCRIPTION OF DRAWINGS

The above and other aspects, features and advantages of the present disclosure will become more apparent from the following detailed description made with reference to the accompanying drawings. In the drawings:

FIG. 4 is a diagram schematically illustrating a flow of the operation of an application in the vehicle mobile terminal manipulation system according to the first embodiment;

PREFERRED EMBODIMENTS FOR CARRYING OUT INVENTION

Hereinafter, multiple embodiments of the present disclosure will be described with reference to the drawings. In the respective embodiments, substantially the same portions are denoted by identical symbols for description.

(First Embodiment)

Hereinafter, a first embodiment will be described with reference to FIG. 1A to FIG. 4.

Hereinafter, an embodiment of the present disclosure will be described with reference to FIG. 1A to FIG. 4.

Figure 1A:
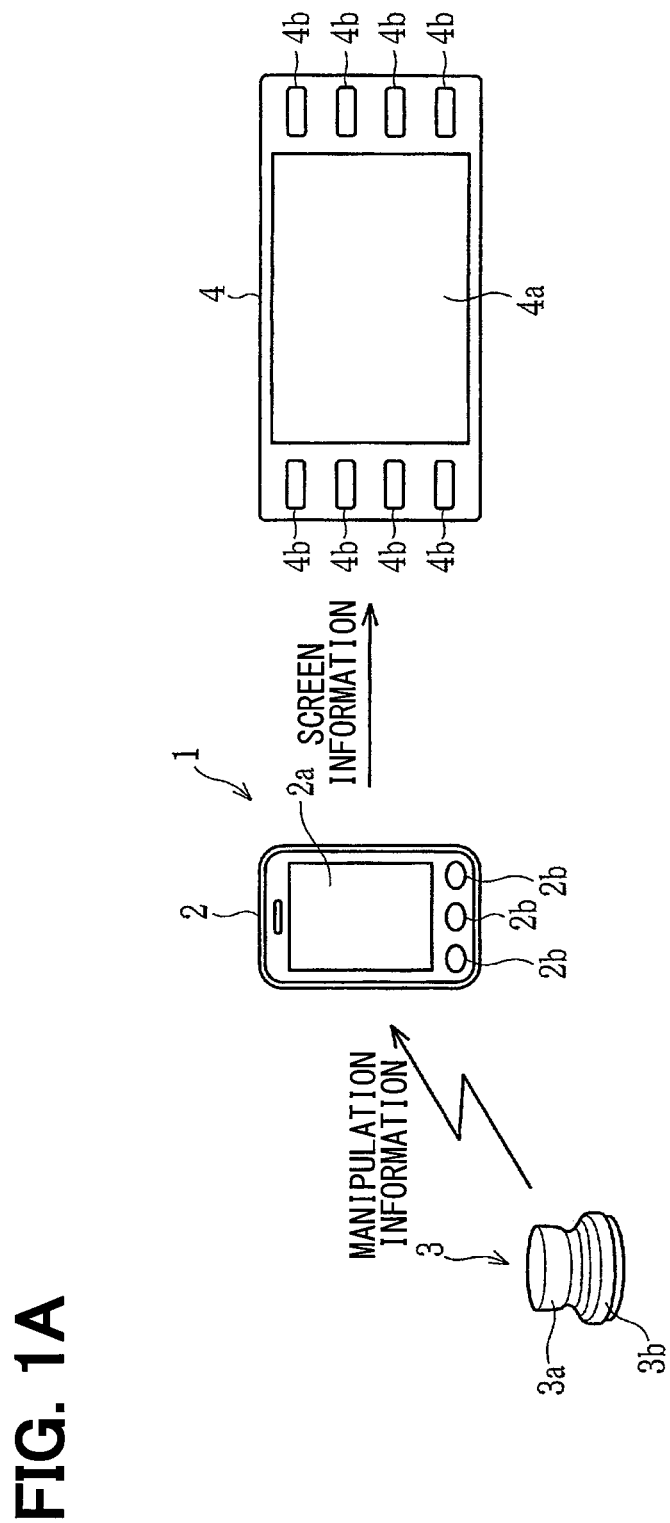
FIG. 1A is a diagram schematically illustrating a configuration and a utilization mode of a vehicle mobile terminal manipulation system according to a first embodiment.
Figure 1B:
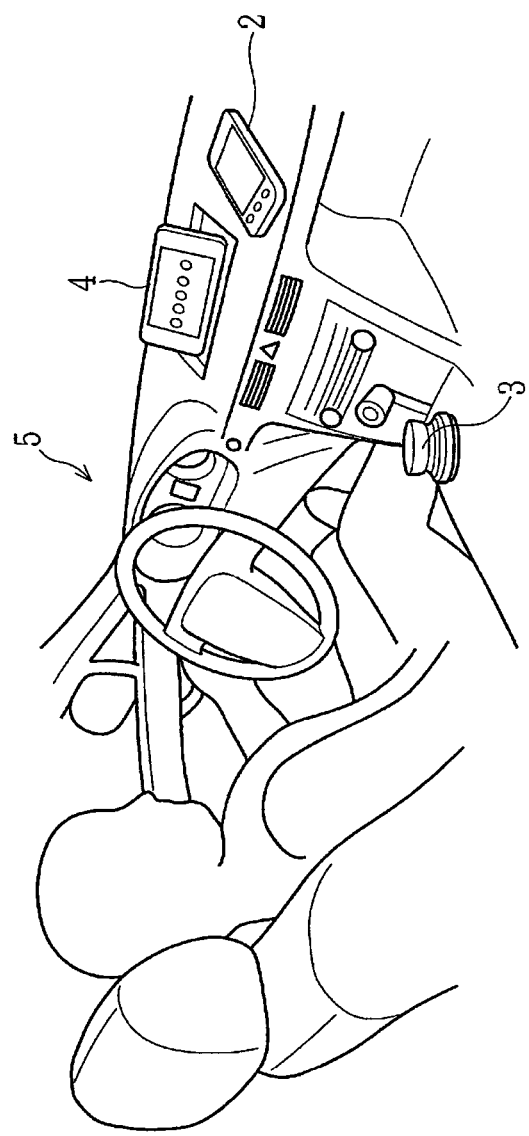
FIG. 1B is a diagram schematically illustrating a configuration and a utilization mode of the vehicle mobile terminal manipulation system according to the first embodiment.

As illustrated in FIG. 1A, a mobile terminal manipulation system 1 (corresponding to a vehicle mobile terminal manipulation system) according to the present embodiment includes a mobile terminal 2, a controller 3 as a manipulation device, and a vehicular device 4. The mobile terminal 2 includes a terminal-side display portion 2a and a terminal-side manipulation portion 2b that is disposed in correspondence with the terminal-side display portion 2a, and includes a touch panel (not shown) and a manipulation switch. In the present embodiment, an advanced cellular phone called "so-called smartphone" is assumed as the mobile terminal 2. As illustrated in FIG. 1B, the mobile terminal 2 is placed on a dashboard in a vehicle 5. However, in the present embodiment, the mobile terminal 2 prohibits a manipulation input to the terminal-side manipulation portion 2b in a state where the mobile terminal 2 is connected to be communicable with the vehicular device 4. For that reason, the mobile terminal 2 may not be placed on the dashboard, and may be put, for example, in a user's breast pocket or bag.

The mobile terminal 2 includes a control portion configured by a CPU and a storage portion configured by a flash memory although not shown, and operates according to manipulation conducted on the terminal-side manipulation portion 2b. In the mobile terminal 2, the user's manipulation conforming to physical laws such as touch manipulation, flick operation, swiping operation, or drag manipulation is conducted on the touch panel. While the mobile terminal 2 can be intuitively manipulated by those manipulations, a user is required to watch the terminal-side display portion 2a or continuously touch the terminal-side display portion 2a with user's finger until the manipulation is completed.

Figure 2:
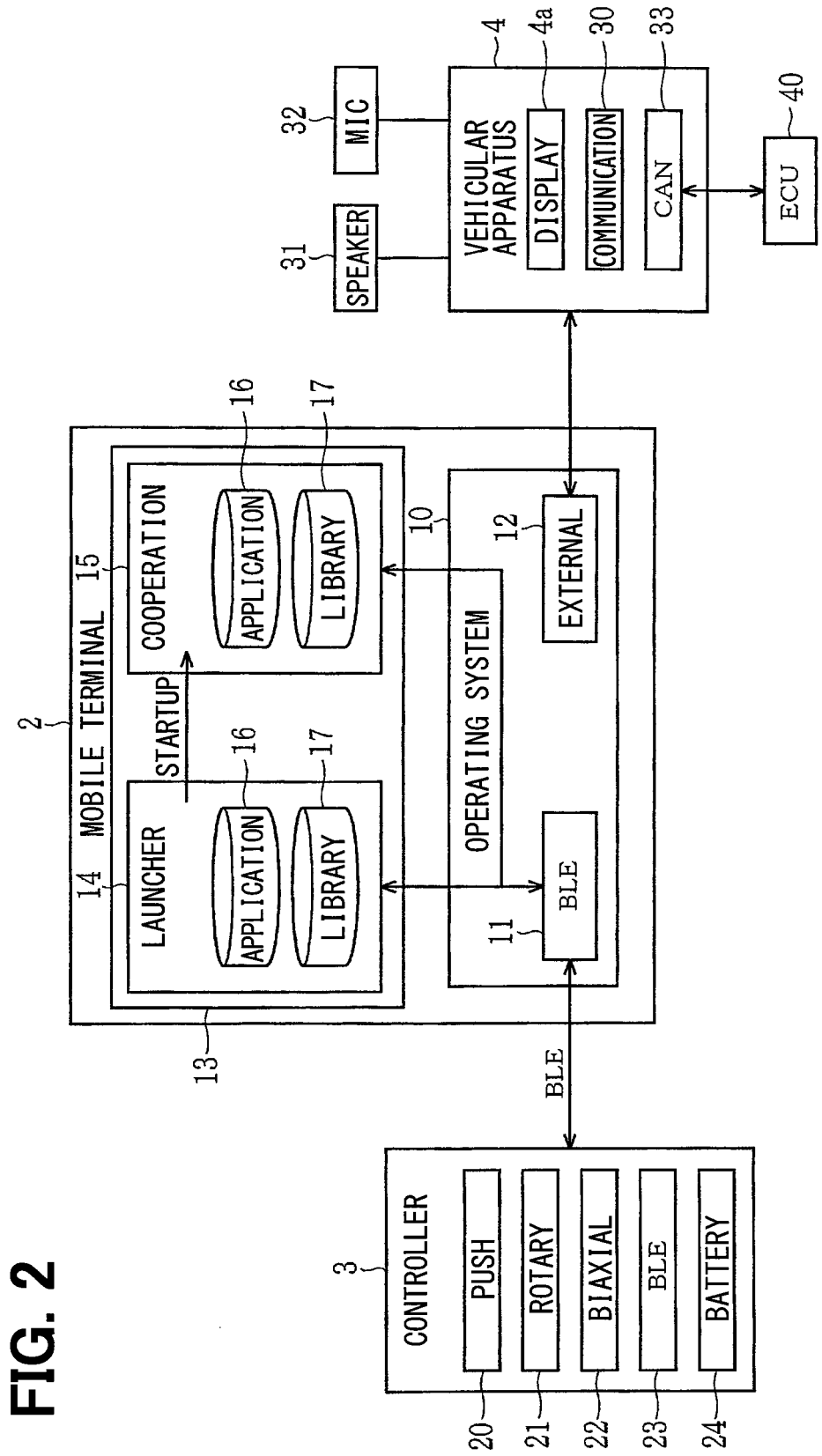
FIG. 2 is a diagram schematically illustrating an electric configuration of the vehicle mobile terminal manipulation system according to the first embodiment.

As illustrated in FIG. 2, the mobile terminal 2 is provided with a BLE communication portion 11 and an external communication portion 12 under the control of an operating system 10. The BLE communication portion 11 is configured to perform a communication with the controller 3 by Bluetooth (registered trademark) Low Energy, and corresponds to a first terminal-side communication portion. The external communication portion 12 is configured to perform a communication with the vehicular device 4 by WiFi, and corresponds to a second terminal-side communication portion. Hereinafter, Bluetooth is referred to as "BT", and Bluetooth Low Energy is referred to as "BLE".

The mobile terminal 2 includes a launcher program 13 for providing a user interface so as to list a variety of applications. An application (hereinafter referred to as "launcher application 14") installed in the mobile terminal 2 in advance, or an application (hereinafter referred to as "cooperative application 15") downloaded by the user is started by the aid of the launcher program 13. The launcher application 14 and the cooperative application 15 each include an application main body 16 that is a program for realizing the function of the application, and a library 17 that is a program for accepting the manipulation from the controller 3.

The library 17 corresponds to a conversion program that converts manipulation information notified from the controller 3 into information acceptable by the application main body 16. In the present embodiment, the library 17 is provided by a manufacturer of the controller 3. For that reason, an application creator can realize the function for accepting the manipulation from the controller 3 by merely installing the library 17 even without taking the communication with the controller 3 and the conversion of the manipulation information into consideration. The launcher application 14 and the cooperative application 15 may be each provided in plurality.

The mobile terminal 2 is connected to be communicable with the controller 3. The controller 3 is a dedicated device for manipulating the mobile terminal 2. As illustrated in FIG. 1A, the controller 3 includes a manipulation knob 3a that is manipulated by the user, and a base part 3b for fixing the manipulation knob 3a in a vehicle interior. The manipulation knob 3a is formed substantially into a cylindrical shape, and has a size operable while being accommodated in a driver's palm or sandwiched between driver's fingers. The base part 3b is fixed to the vehicle interior, for example, by a magnetic force. A fixing method is not limited to the magnetic force, but may be provided with a dedicated holder.

As illustrated in FIG. 1B, the controller 3 is placed at a position to be easily manipulated by the driver, for example, a center console between a driver's seat and a passenger's seat in the vehicle 5. In that case, the controller 3 may be fixed at a specific position of the vehicle 5. However, in the present embodiment, the driver can place the controller 3 at an arbitrary position, and can remove the controller 3 from that position.

The controller 3 is driven by a battery 24, and a power cable is unnecessary in use. For that reason, the controller 3 can be brought to a vehicle exterior. The controller 3 is provided with a power switch turning on or off a power supply.

As illustrated in FIG. 2, the controller 3 includes a push manipulation detection portion 20, a rotary manipulation detection portion 21, and a biaxial manipulation detection portion 22. The controller 3 can input push manipulation for pushing the manipulation knob 3a toward a side of the base part 3b, rotary manipulation for relatively rotating the manipulation knob 3a with respect to the base part 3b, and biaxial manipulation for tilting the manipulation knob 3a to any one of biaxial directions orthogonal to each other with the base part 3b as a center. In other words, as compared with a case in which the touch panel disposed in the mobile terminal 2 is manipulated, the controller 3 can input simplified manipulation. For that reason, the controller 3 can input the manipulation by such an intermittent operation as to manipulate a switch without requiring such a continuous operation to trace the touch panel. In this way, the controller 3 and the terminal-side manipulation portion 2b of the mobile terminal 2 are different in manipulation mode from each other.

The manipulation input to the controller 3 is transmitted as the manipulation information to the mobile terminal 2 through a BLE communication portion 23 (refer to FIG. 1A). The BLE communication portion 23 corresponds to a manipulation-side communication portion. The controller 3 performs pairing through the BLE communication portion 23. Pairing information such as a personal identification number in performing the pairing is fixedly set in the controller 3. For that reason, the pairing is automatically performed by powering on the controller 3 in the vicinity of the mobile terminal 2.

As illustrated in FIG. 1A, the vehicular device 4 includes a vehicle-side display portion 4a and vehicle-side manipulation portions 4b. As illustrated in FIG. 1B, the vehicle-side display portion 4a is attached to a user visible position such as a dashboard of the vehicle 5. As illustrated in FIG. 2, the vehicular device 4 includes a vehicle-side communication portion 30. The vehicle-side communication portion 30 performs a communication with the mobile terminal 2 through, for example, a wireless communication system such as WiFi (registered trademark) or Bluetooth (registered trademark, hereinafter referred to as "BT"), or a wired communication system such as HDMI (high-definition multimedia interface, registered trademark) or an USB (universal serial bus). In the present embodiment, Wifi is used as the communication system.

As illustrated in FIG. 1A, the vehicular device 4 accepts display information for displaying a screen of the mobile terminal 2 on the vehicle-side display portion 4a by proxy, and also accepts voice information for outputting voice from a speaker 31 (refer to FIG. 2) of the vehicular device 4. The vehicular device 4 displays an operation screen of the mobile terminal 2 on the vehicle-side display portion 4a on the basis of the display information. The vehicle-side display portion 4a is disposed in a visual field of the driver, and provided with a relatively large screen, so as to be easily watched even during driving.

The vehicular device 4 talks back the operating state of the application corresponding to the manipulation input to the controller 3 from the speaker 31 by voice. In this situation, the talkback operating state includes an operating state when selecting the application. The speaker 31 corresponds to an audio output device. In the present embodiment, the execution per se of the application is conducted by the mobile terminal 2, and the vehicular device 4 functions as a display terminal for displaying the operation screen of the application executed in the mobile terminal 2.

As illustrated in FIG. 2, the vehicular device 4 is also connected to a microphone 32. The vehicular device 4 can perform a hands-free telephone or speech recognition when being connected with the mobile terminal 2 with the use of voice from the microphone 32. The vehicular device 4 is also connected to a variety of ECUs 40 (electronic control unit) mounted in the vehicle 5 through a CAN connection portion 33 that functions as, for example, a CAN (controller area network) interface. The ECUs 40 are equipped with a variety of sensors for detecting a travel state of the vehicle 5. For that reason, information such as a position, a posture, or an acceleration of the vehicle 5 can be acquired by the vehicular device 4, or transmitted to the mobile terminal 2.

In the mobile terminal manipulation system configured as described above, the mobile terminal 2 provides a user interface different depending on a difference of the manipulation mode between when operating alone and when outputting the screen to the vehicular device 4. Specifically, the mobile terminal 2 provides the user interface so as to display the application with an icon by the aid of the launcher program 13 when operating alone, conduct swiping operation when the number of applications is large, or manipulate a scroll bar M1 illustrated in FIG. 3A when the amount of information to be displayed is large.

Figure 3A:
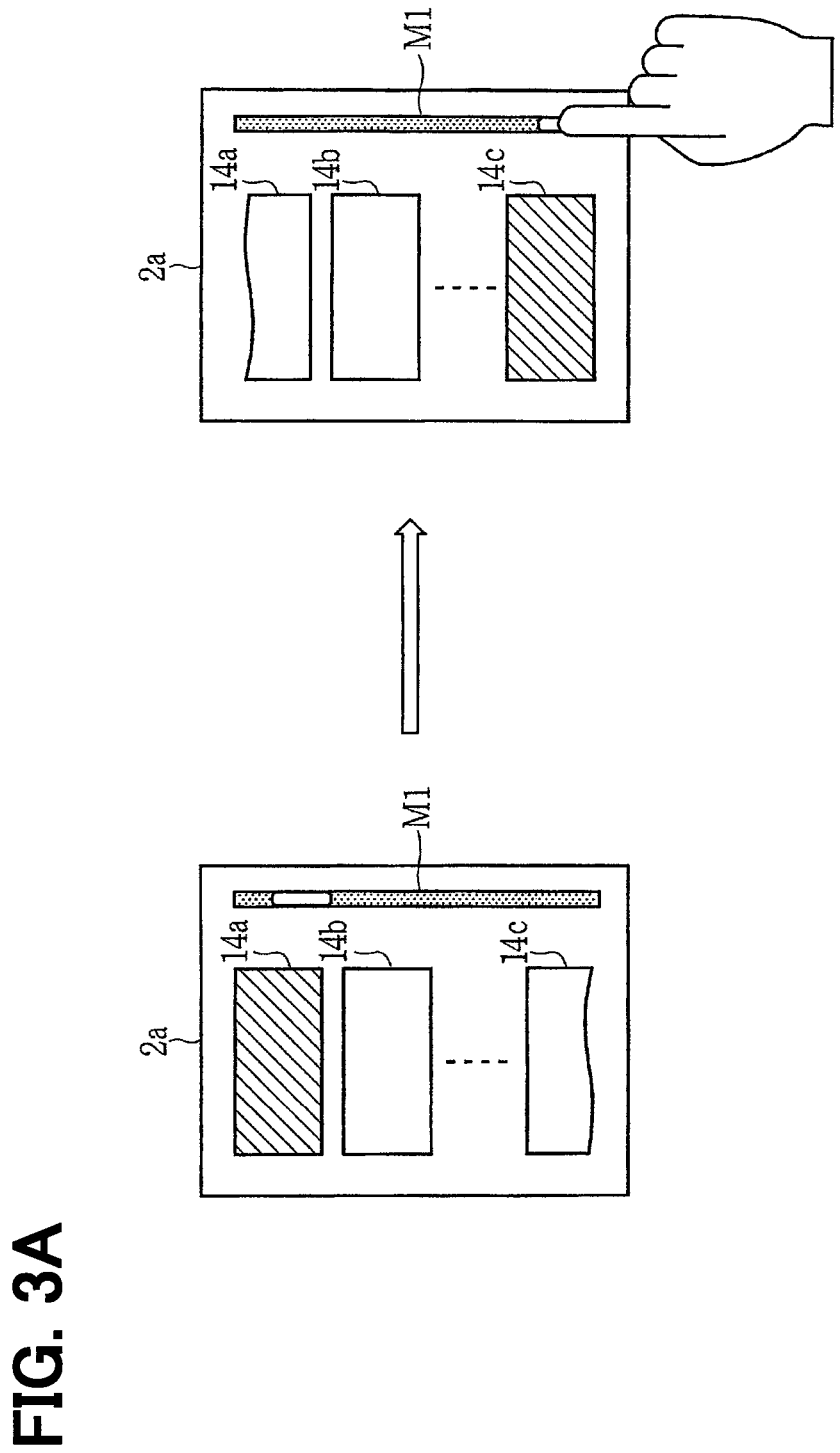
FIG. 3A is a diagram illustrating one example of a screen display and a manipulation mode in a mobile terminal and a vehicular device according to the first embodiment.
Figure 3B:
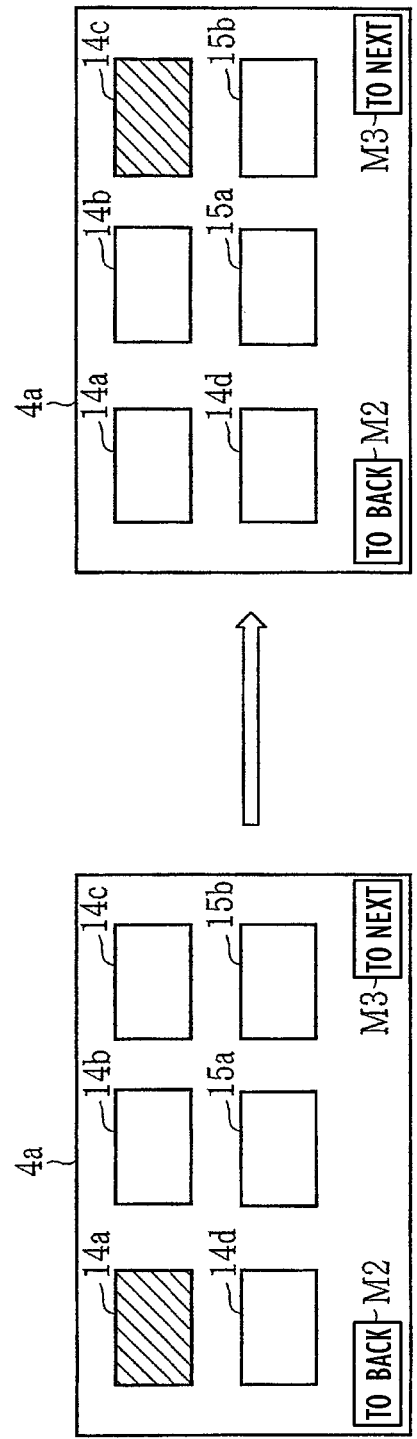
FIG. 3B is a diagram illustrating another example of the screen display and the operation mode in the mobile terminal and the vehicular device according to the first embodiment.

In the case where three applications of launcher applications 14a to 14c are displayed with icons, and the launcher application 14a is focused at the present time as illustrated in FIG. 3A, when the user wants to start the launcher application 14c out of the screen in a state where, for example, the launcher application 14a is focused, the user needs to manipulate the scroll bar M1 by his finger, and further perform touch manipulation on the launcher application 14c. In other words, the user needs to continuously watch the screen to some extent as described above. FIG. 3A and FIG. 3B schematically illustrate the focused application by hatching.

On the contrary, when the mobile terminal 2 is connected with the controller 3 and the vehicular device 4, as illustrated in FIG. 3B, the mobile terminal 2 displays the application with an icon by the launcher application. FIG. 3B schematically illustrates a state in which six applications of the launcher applications 14a to 14d and cooperative applications 15a and 15b are displayed with the icons, and a to-back button M2 and a to-next button M3 for switching the screen of the launcher are displayed. Thus, the mobile terminal 2 can be manipulated with the use of the controller 3 that performs the manipulation input by a relatively simple operation.

In that case, when the rotary manipulation is input from the controller 3 to the mobile terminal 2, the mobile terminal 2 moves a focus to change the selected application. In this situation, the mobile terminal 2 provides a user interface so as to display the to-back button M2 or the to-next button M3 for the purpose of switching the screen to another, for example, when the number of applications is too large to fit on a single screen. The mobile terminal 2 starts the selected application by performing the push manipulation in a state where any icon is selected.

FIG. 3B illustrates an example of the user interface compatible with the manipulation from the controller 3, and the user interface is not limited to the above configuration. For example, instead of the display of the to-back button M2 and the to-next button M3, the biaxial manipulation may be compatible with the switching of the screen.

When the mobile terminal 2 is connected to the controller 3 and the vehicular device 4, the mobile terminal 2 notifies the user of an icon selection state by voice. For example, in the case where a name of the launcher application 14a is "navigation", when the launcher application 14a is selected by the manipulation from the controller 3, the mobile terminal 2 outputs voice of "navigation" from the speaker 31 in the present embodiment. With the provision of the user interface described above, the user can manipulate the mobile terminal 2 with the use of the controller 3.

With the provision of the user interface described above, the user can select and execute the application even when the user does not continuously watch the screen.

Subsequently, the operation of the application in the mobile terminal manipulation system 1 will be described with reference to FIG. 4. It is assumed that the mobile terminal 2 has already been connected to the vehicular device 4, the operation screen (launcher screen) of the launcher program 13 with the icons displayed as illustrated in FIG. 3B described above is displayed on the vehicular device 4. In the present embodiment, the launcher program 13 displays only the application in which the library 17 is installed among the applications registered in the mobile terminal 2.

When a power is turned on, the controller 3 first executes a BT4.0 advertising process. This process is based on the specification of the BT4.0 and searches another BT connectable equipment present around the controller 3. When another equipment (the mobile terminal 2 in the present embodiment) is searched in the BT4.0 advertising process, pairing is executed between the controller 3 and the mobile terminal 2. The pairing is performed by the library 17 of the launcher application 14. The pairing per se may be performed by the launcher program 13. Upon the completion of the pairing, the manipulation of the mobile terminal 2 using the controller 3 can be performed.

When the user manipulates the controller 3 after pairing, the controller 3 transmits the manipulation information to the mobile terminal 2. According to the manipulation information, for example, when the user performs the rotary manipulation, a fact that the rotary manipulation has been performed is notified to the mobile terminal 2. The launcher application 14 that has received the notification converts the user's manipulation input to the controller 3 specified according to the manipulation information into the operation information for operating the application main body 16 in the library 17, and transfers the converted operation information to the application main body 16. The application main body 16 operates according to the manipulation from the controller 3.

In this situation, the screen display that changes according to the operation of the application is transmitted to the vehicular device 4 as the screen information, and is displayed on the vehicle-side display portion 4a (application display is illustrated in FIG. 4). While the selecting manipulation of the application is being performed, voice output by talkback is performed. The voice generated during the operation of the application is transmitted to the vehicular device 4 as the voice information, and output from the vehicle speaker 31. For that reason, the user can manipulate the mobile terminal 2 even without watching the mobile terminal 2, and by manipulating the controller 3 in a shorter time than that when manipulating the touch panel of the mobile-side manipulation portion.

When the user inputs the manipulation of starting the cooperative application 15, the manipulation information is transmitted from the controller 3 to start the cooperative application 15. In this situation, since the pairing with the controller 3 can be performed for each application in the BLE, there is a need to perform the pairing between the controller 3 and the cooperative application 15. Since a waiting time is required to again execute the pairing, when the pairing has already been completed in the present embodiment, the cooperative application 15 takes over information on the pairing as takeover information, and the pairing is performed between the cooperative application 15 and the controller 3 on the basis of the takeover information.

Upon the completion of the pairing, since the library 17 is also installed in the cooperative application 15, the conversion into the operation information is performed on the basis of the manipulation information notified from the controller 3, and the cooperative application 15 operates according to the manipulation from the controller 3. In other words, the manipulation of the mobile terminal 2 can be performed by the controller 3. In this situation, the operation screen and voice when the cooperative application 15 is operating are also displayed on the vehicle-side display portion 4a of the vehicular device 4.

As described above, in the mobile terminal manipulation system 1, the mobile terminal 2 is manipulated by the dedicated controller 3 for manipulating the mobile terminal 2 in the vehicle interior.

The present embodiment described above can obtain the following effects.

In the mobile terminal manipulation system 1, the dedicated controller 3 is used when manipulating the mobile terminal 2. The controller 3 can perform the manipulation inputs such as the push manipulation, the rotary manipulation, and the biaxial manipulation, which are simplified as compared with a case in which the touch panel disposed on the mobile terminal 2 is manipulated. With the use of the controller 3, the mobile terminal 2 can be manipulated by inputting the simplified manipulation. With the above configuration, even in the application assumed to be input from the touch panel, the mobile terminal can be manipulated without watching the screen. Therefore, a risk that the manipulation of the mobile terminal 2 in the vehicle interferes with driving can be reduced.

In the mobile terminal manipulation system 1, the mobile terminal 2 includes a second terminal-side communication portion that communicates with the vehicular device 4, and when the mobile terminal 2 is connected with the vehicular device 4, an operating state of the mobile terminal 2 is displayed on the vehicle-side display portion 4a of the vehicular device 4. The vehicle-side display portion 4a of the vehicular device 4 is disposed in a visual field of the driver, and provided with a relatively large screen, so as to be easily watched even during driving. For that reason, the vehicle-side display portion 4a frequently has a screen larger than that of general smartphones. For that reason, the screen of the mobile terminal 2 is displayed on the vehicle-side display portion 4a with the results that the user can grasp the operating state of the application with a visible size more than that of the mobile terminal 2 without largely diverting a field of view from the front. Therefore, a risk that the manipulation interferes with driving can be more reduced, and the safety when manipulating the mobile terminal 2 in the vehicle interior can be further enhanced.

In the mobile terminal manipulation system 1, the mobile terminal 2 prohibits, that is, does not accept, the manipulation conducted on its own terminal-side manipulation portion 2b when being connected with the vehicular device 4. Thus, the mobile terminal 2 can be prevented from being manipulated directly during driving.

In the mobile terminal manipulation system 1, the mobile terminal 2 provides a user interface different depending on a difference of the manipulation mode when being connected with the vehicular device 4 as illustrated in FIG. 3A and FIG. 3B. Thus, the mobile terminal 2 can be manipulated with the use of the controller 3 that performs the manipulation input by a relatively simple operation.

In the mobile terminal manipulation system 1, an audio output device such as the speaker 31 is provided, and the operating state of the application corresponding to the manipulation input to the controller 3 is talked back by voice. Thus, the selection state of the application can be grasped even without watching the screen. Therefore, a risk that the operation interferes with driving can be further reduced.

In the mobile terminal manipulation system 1, the library 17 is installed in each of the multiple applications to be executed by the mobile terminal 2. The manipulation information notified from the controller 3 is converted into the operation information in each of the applications. The library 17 is provided from a manufacturer of the controller 3. Thus, the creator of each application can provide the application manipulated by using the controller 3 even without performing a work for designing the interface between the library 17 and the controller 3.

In the mobile terminal manipulation system 1, the application in which the library 17 is installed is extracted from the applications registered in the mobile terminal 2, and displayed. Thus, in a state where the mobile terminal 2 is connected to the vehicular device 4, the applications not compatible with the manipulation in the controller 3, in other words, the applications required to watch the screen during manipulation are no longer originally displayed. Therefore, a risk that the operation interferes with driving can be reduced.

In the mobile terminal manipulation system 1, the mobile terminal 2 and the controller 3 are connected to each other by the BLE. The BLE is a specification for performing a BT communication in an equipment relatively small in size and using the battery 24. For that reason, with the configuration in which the communication is performed by the BLE, power saving operation can be performed, and a lifetime of the battery 24 can be elongated. The BLE communication can be used together with the BT communication (for example, communication in BT2.0) for performing hands-free conversation.

In this situation, in the mobile terminal manipulation system 1, when the controller 3 is powered on, pairing is automatically performed. Thus, the user's manipulation for connection is unnecessary, and the convenience can be enhanced.

In the mobile terminal manipulation system 1, the pairing information between the mobile terminal 2 and the controller 3 is shared as information taken over between the multiple applications registered in the mobile terminal 2. Thus, re-pairing in executing a different application becomes unnecessary, and the convenience can be improved.

(Second Embodiment)

A second embodiment will be described with reference to FIG. 5 to FIG. 7. The second embodiment is different from the first embodiment in that a vehicle resource mounted in a vehicle in advance is used as a manipulation device.

In a mobile terminal manipulation system 1 according to the present embodiment, it is assumed that a manipulation device includes a touch panel 4b, a steering switch 50, a haptic device 51, and a rear seat remote controller 52. However, there is no need to always provide all of those components, but a configuration having one or two components may be applied. In the following description, the touch panel 4b, the steering switch 50, the haptic device 51, and the rear seat remote controller 52 are also referred to as "vehicle-mounted controller" for descriptive purpose, and the equipments including the vehicle-mounted controller and a vehicular device 4 mounted in a vehicle in advance are also referred to as "vehicle-side resource" for descriptive purpose. The vehicle resource may include the controller 3 described in the first embodiment.

Figure 6A:
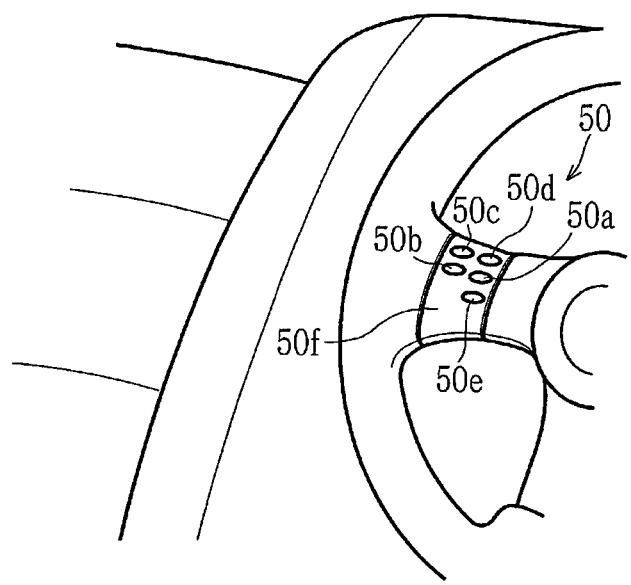
FIG. 6A is a diagram schematically illustrating one exterior of a manipulation device according to the second embodiment.
Figure 7:
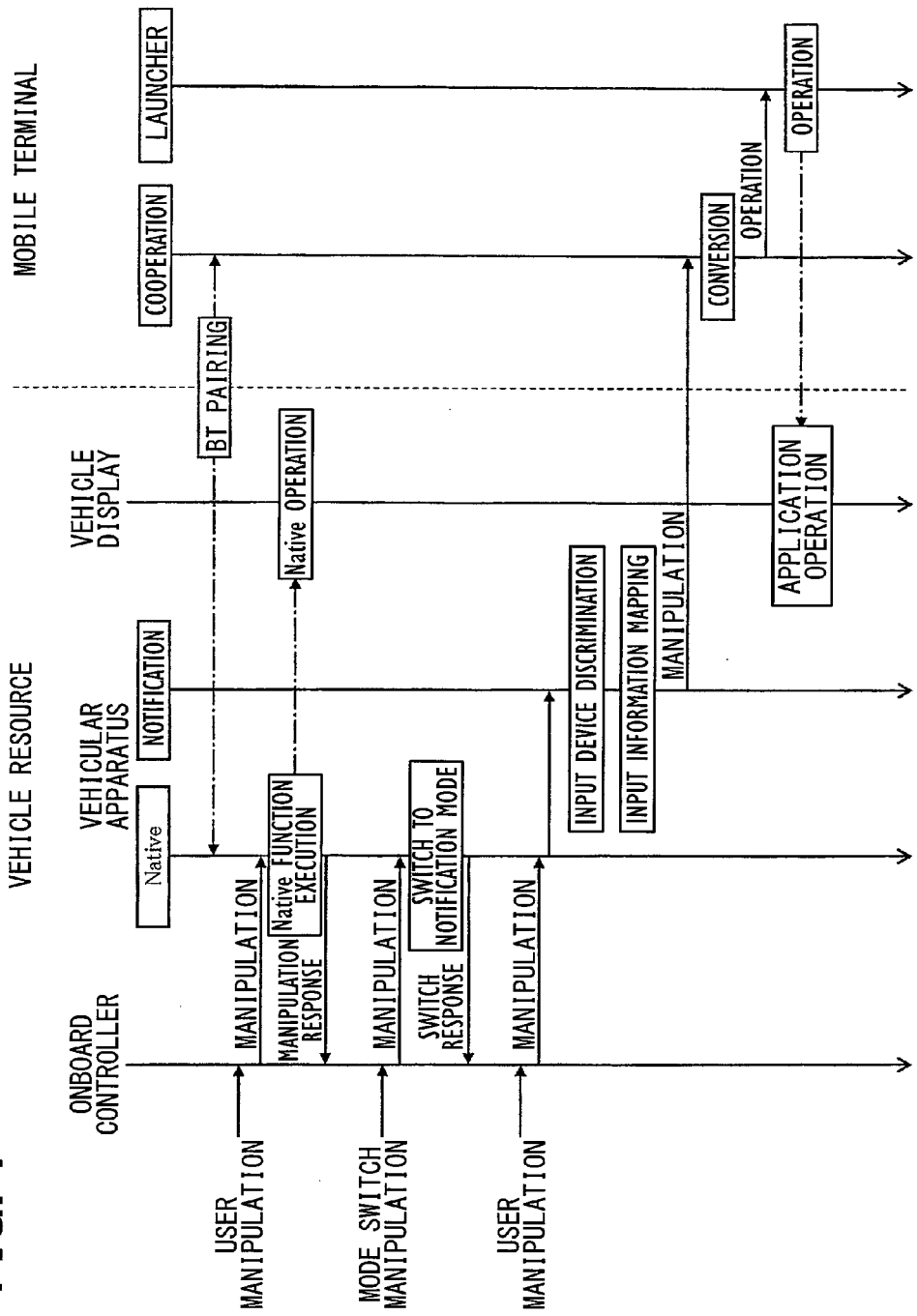
FIG. 7 is a diagram schematically illustrating a flow of the operation of an application in the vehicle mobile terminal manipulation system according to the second embodiment.

The steering switch 50 is attached to a steering as illustrated in FIG. 6A, and includes multiple switches that can be manipulated by a finger even without releasing the finger from the steering. In the present embodiment, the steering switch 50 includes an up key 50a, a down key 50b, a left key 50c, a right key 50d, a back key 50e, and a dial key 50f also serving as a determination key.

Figure 6B:
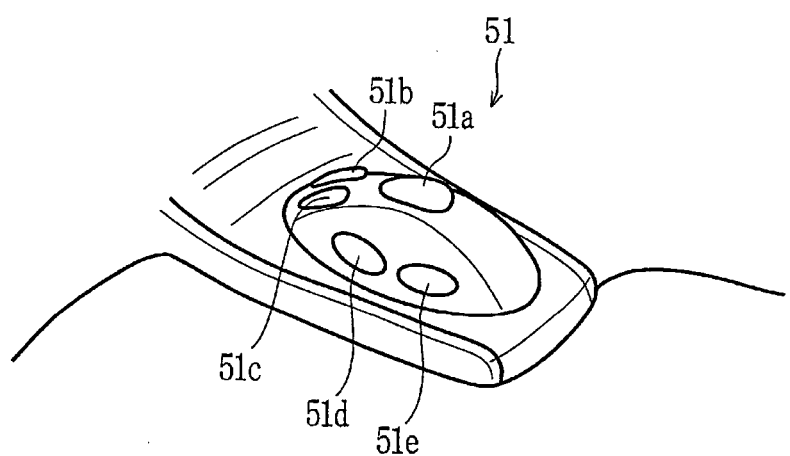
FIG. 6B is a diagram schematically illustrating another exterior of the manipulation device according to the second embodiment.

As illustrated in FIG. 6B, the haptic device 51 is installed, for example, on a center console, and includes multiple switches that are manipulated along with the user's hand. In the present embodiment, the haptic device 51 includes a seesaw key 51a, a determination key 51b, a back key 51c, a first side key 51d, and a second side key 51e.

Although not shown, the rear seat remote controller 52 can input the same manipulation as that of the steering switch 50 and the haptic device 51 from the rear seat.

In the present embodiment, the touch panel 4b is not configured to be manipulated while watching the screen as in the case of manipulating the mobile terminal 2, but is configured so that multiple simple manipulation buttons indicative of a vertical direction and a horizontal direction are displayed, and used instead of a simple switch.

In this case, since the multiple manipulation devices are present, those operating devices are prioritized. In the present embodiment, the controller 3 is highest in the prioritization of the manipulation devices, and subsequently, the steering switch 50, the haptic device 51, the touch panel 4b, and the rear seat remote controller 52 are lower in this order.

Figure 5:
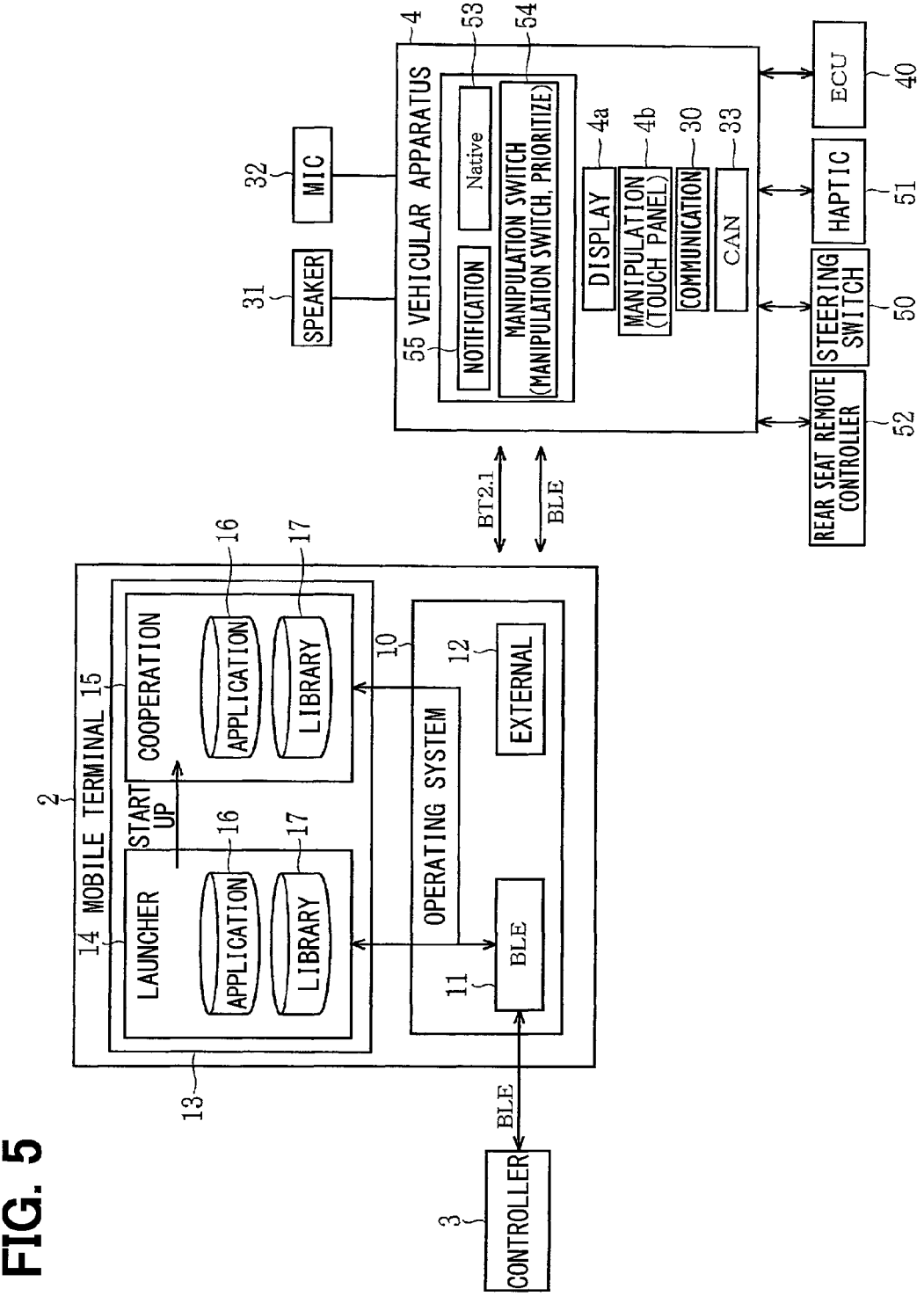
FIG. 5 is a diagram schematically illustrating an electric configuration of a vehicle mobile terminal manipulation system according to a second embodiment.

As illustrated in FIG. 5, the vehicular device 4 is substantially common in the configuration to that in the first embodiment. However, in the present embodiment, a vehicle-side communication portion 30 employs BT and BLE as a communication system. For that reason, the vehicular device 4 and the mobile terminal 2 can communicate with each other by the BT and the BLE. The vehicular device can execute a native application 53, a manipulation switching application 54, and a notification application 55.

The native application 53 is configured to control a variety of vehicle-mounted devices mounted in the vehicle in advance, such as an air conditioner or an audio device. The vehicular device 4 controls the vehicle-mounted device always according to the manipulation input from the vehicle-mounted controller by execution of the native application 53. Specifically, as illustrated in FIG. 7, when user manipulation is conducted on the vehicle-mounted controller, the vehicular device 4 executes the native function for controlling the audio device or adjusting the air conditioner on the basis of the manipulation information indicative of the user manipulation, and returns a manipulation response to the vehicle-mounted controller while displaying an execution result, for example, on a vehicle-side display portion 4a.

The manipulation switching application 54 switchingly notifies the vehicle-side resource or the mobile terminal 2 of the user's manipulation conducted on the vehicle-mounted controller. In the present embodiment, the vehicular device 4 switchingly notifies the mobile terminal 2 of the user's operation in response to a request from the vehicle-mounted controller when putting into a communicable state with the mobile terminal 2. In the present embodiment, the mobile terminal 2 is brought in the vehicle, and the pairing using the BT is automatically performed at a time when the vehicular device 4 is powered on, resulting in a state where the communication using the BT can be performed.

Thus, the mobile terminal 2 can be manipulated by the vehicle-mounted controller. Specifically, as illustrated in FIG. 7, when a mode switching manipulation is input to the vehicle-mounted controller (a switching request is performed), the vehicular device 4 switches an operation mode to a notification mode. The notification mode is an operation mode for notifying not the vehicle-mounted device but the mobile terminal 2 of the manipulation information indicative of the information conducted on the vehicle-mounted controller through the BLE. When the operation mode switches to the notification mode, the vehicular device 4 enables the communication through the BLE, determines an input device on the basis of the manipulation information indicative of the manipulation conducted on the vehicle-mounted controller, and notifies the mobile terminal 2 side of the manipulation information after mapping the input information (association of the switch of the determined vehicle-mounted controller with the manipulation information notified to the mobile terminal 2).

As in the first embodiment, the mobile terminal 2 that has received the notification of the manipulation information converts the manipulation information into operation information by which the mobile terminal 2 per se can operate in the cooperative application 15, and performs the operation of executing its own application on the basis of the converted operation information. In this situation, the mobile terminal 2 selects the manipulation information to be prioritized on the basis of the prioritization of the manipulation devices described above, and operates. As in the first embodiment, the mobile terminal 2 displays an operation screen of the application on the vehicle-side display portion 4a. Thus, the operating state of the mobile terminal 2 can be confirmed in the vehicle-side display portion 4a.

As described above, in the present embodiment, the manipulation of the mobile terminal 2 is performed with the use of the vehicle-side resource mounted in the vehicle in advance.

The mobile terminal manipulation system 1 includes the manipulation device (4b, 50, 51, 52) inputting the manipulation by the user, and the vehicle-side communication portion 30 as a notification portion notifying the mobile terminal 2 of the manipulation information indicative of the input manipulation. The mobile terminal 2 operates according to the manipulation conducted on its own terminal-side manipulation portion 2b while operating according to the manipulation conducted on the manipulation device (4b, 50, 51, 52) different in manipulation mode from its own terminal-side manipulation portion 2b on the basis of the manipulation information notified from the manipulation device (4b, 50, 51, 52). With the above configuration, even in the application assumed to be input from the touch panel, the mobile terminal can be manipulated without watching the screen. Therefore, a risk that the manipulation of the mobile terminal 2 in the vehicle interferes with driving can be reduced.

The manipulation devices inputting the manipulation by the user employ the vehicle-side resource such as the touch panel 4b, the steering switch 50, the haptic device 51, or the rear seat remote controller 52, which are disposed in the vehicle for the purpose of manipulating the vehicle-mounted devices that are equipments mounted in the vehicle. Thus, a dedicated manipulation device for manipulating the mobile terminal 2 may not be provided.

Since the multiple manipulation devices are prioritized, even when the manipulation information from the manipulation devices overlaps with each other, the operation is performed on the basis of the prioritization, thereby being capable of performing accurate operation.

Since the vehicular device 4 is automatically paired with the mobile terminal 2, and put into a communicable state when the vehicular device 4 is powered on, the manipulation for connection becomes unnecessary, and the convenience can be enhanced. Since the operation mode switches to the notification mode according to the mode switching manipulation by the user, the operation mode can be prevented from switching to the notification mode without user's intention to disable the control of the vehicle-mounted device. In this situation, since the communication of the manipulation information is performed through the BLE, the power saving operation can be performed as in the first embodiment.

Since the screen of the mobile terminal 2 is displayed on the vehicle-side display portion 4a, the user can grasp the operation without largely diverting a field of view from the front, and in an easily visible state more than that of the mobile terminal 2. Therefore, a risk that the manipulation interferes with driving can be more reduced, and the safety when manipulating the mobile terminal 2 in the vehicle interior can be further enhanced.

The configuration described in the first embodiment may be applied to the mobile terminal manipulation system 1 of the present embodiment. With this configuration, the same effects as those in the above first embodiment can be obtained. For example, the manipulation conducted on the terminal-side manipulation portion 2b is prohibited when the mobile terminal 2 is connected to the vehicular device 4, thereby being capable of directly manipulating the mobile terminal 2 during driving. With the provision of the user interface different depending on the difference in the manipulating mode when the mobile terminal 2 is connected with the vehicular device 4, the mobile terminal 2 can be manipulated by using the vehicle-mounted controller that performs the manipulation input with relatively simple manipulation. Since the operating state is talked back according to the input manipulation by voice, the selection state of the application can be grasped even without watching the screen, and a risk that the manipulation interferes with driving can be further reduced. Since the pairing information between the mobile terminal 2 and the vehicle-mounted controller is shared as the information taken over among the multiple applications registered in the mobile terminal 2, re-pairing in execution of a different application becomes unnecessary, and the convenience can be improved.

(Other Embodiments)

The present disclosure is not limited to the exemplifications of the above respective embodiments, but can be arbitrarily modified and expanded without departing from the scope of the exemplifications.

In the embodiments, the mobile terminal 2 is connected to the vehicular device 4, but in the present disclosure, the vehicular device 4 is not always essential. In other words, the mobile terminal 2 may be placed on the dashboard in a state where the terminal-side display portion 2a is visible, and the mobile terminal 2 may be manipulated by using the controller 3. With this configuration, even when the vehicular device 4 is not provided, the mobile terminal 2 can be used while the risk that the operation interferes with driving is reduced.

An operation resistance caused when manipulating the manipulation knob 3a may be changed on the basis of the charge level of the battery 24. For example, a resistance load is changed so that the rotary manipulation becomes heavier when the charge level of the battery 24 in the controller 3 is reduced more, thereby being capable of warning the user about the charge level of the battery 24. With the warning of the charge level of the battery 24, a risk that the user suffers from a disadvantage such that the controller 3 becomes suddenly inoperable can be reduced.

An acceleration detection portion for detecting acceleration may be installed in the controller 3, and an orientation of the controller 3, in other words, a manipulation direction conducted on the manipulation devices may be detected on the basis of the acceleration detected by the acceleration detection portion. In the configuration of the second embodiment, the acceleration may be detected from an acceleration sensor used for vehicle control, for example, by the ECU 40. For example, when front, rear, right and left directions when manipulating the controller 3 are deviated from up, down, right and left directions on the screen display, the manipulation may be difficult to perform. It is not preferable that a situation in which the controller 3 is watched for the purpose of adjusting the direction of the controller 3 occurs. For that reason, a traveling direction of the vehicle 5 is determined on the basis of the acceleration, and made to correspond to the direction, for example, when performing the biaxial manipulation or the rotary manipulation, thereby being capable of preventing the manipulation from becoming hardly performed.

In that case, the user interface compatible with the direction of the controller 3 may be provided. Specifically, the direction of the controller 3 may be corrected by the mobile terminal 2, and a correspondence relationship between the user's manipulation and the up and down directions of the screen display may be corrected.

The manipulation of the controller 3 may be associated with a mechanical switch provided in the mobile terminal 2. For example, an application operating on Android (registered trademark) may assume that a home button is present. For that reason, the manipulation of the controller 3 may be compatible with a mechanical switch, or an icon corresponding to the home button may be provided as the user interface so that the application operating on Android (registered trademark) can be used.

Since the controller 3 is detachably attached, the mobile terminal 2 can be manipulated with the use of the controller 3 even from a passenger's seat or a rear seat.

The vehicle-side resource such as the haptic device 51 or the rear seat remote controller 52 is used. Thus, a dedicated manipulation device for manipulating the mobile terminal 2 may not be provided.

In the vehicle-mounted controller, the notification mode may be set, individually. For example, only the manipulation conducted on the steering switch 50 may be notified to the mobile terminal 2, and the manipulation conduced on the haptic device 51 and the rear seat remote controller 52 may be notified to the vehicle-mounted device as usual.

The controller 3, the vehicle-side manipulation portion 4b, the steering switch 50, the haptic device 51, and the rear seat remote controller 52 correspond to the manipulation devices of the present disclosure, the BLE communication portion 11 corresponds to the first terminal-side communication portion, and the external communication portion 12 corresponds to the second terminal-side communication portion. The launcher program 13, the launcher applications 14 and 14a to 14d, the cooperative applications 15, 15a to 15b, and the application main body 16 correspond to the application, and the library 17 corresponds to the conversion program. The BLE communication portion 23 corresponds to the manipulation-side communication portion and the notification portion. The vehicle-side communication portion 30 corresponds to the notification portion. The speaker 31 corresponds to the audio output device. The manipulation switching application 54 corresponds to the switching program.

While the embodiments, the configurations, and the modes according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle mobile terminal manipulation system that manipulates a mobile terminal brought in a vehicle, comprising:
   a mobile terminal including a terminal-side display portion and a terminal-side manipulation portion, the mobile terminal in which a plurality of applications being registered;
   a manipulation device to which a user inputs manipulation, a manipulation mode of the manipulation device being different from a manipulation mode of the terminal-side manipulation portion; and
   a notification portion that is provided into the manipulation device, and notifies the mobile terminal of manipulation information indicative of manipulation which has been input to the manipulation device,
   wherein:
   the mobile terminal is configured to independently operate according to the manipulation conducted on the manipulation device;
   the mobile terminal has a first user interface displayed on the terminal-side display portion when the mobile terminal independently operates;
   the mobile terminal is also configured to operate according to the manipulation conducted on the manipulation device when being connected with a vehicular device; and
   the mobile terminal generates a second user interface different from the first user interface when being connected with the vehicular device and causes a vehicle-side display portion to display the second user interface,
   wherein:
   the manipulation device and the mobile terminal wirelessly communicate with each other by Bluetooth (registered trademark) Low Energy; and
   pairing information between the manipulation device and the mobile terminal is taken over from a first application of the applications registered in the mobile terminal to a second application of the applications.

2. The vehicle mobile terminal manipulation system according to claim 1, wherein:
   the manipulation device includes a manipulation knob;
   the manipulation device enables inputs of push manipulation for pushing the manipulation knob, rotary manipulation for rotating the manipulation knob, and biaxial manipulation for tilting the manipulation knob to any one of biaxial directions;
   the manipulation device includes a manipulation-side communication portion that communicates the manipulation information conducted on the manipulation knob with the mobile terminal;
   the mobile terminal includes a terminal-side display portion, a terminal-side manipulation portion having a touch panel being provided and corresponding to the terminal-side display portion, and a first terminal-side communication portion that communicates with the manipulation device; and
   the mobile terminal
      operates according to the manipulation conducted on the terminal-side manipulation portion,
      executes a conversion program that converts the manipulation information notified from the manipulation device into information acceptable by an application to be executed by the mobile terminal, and
      operates according to the manipulation from the manipulation device different in manipulation mode from the terminal-side manipulation portion of the mobile terminal.

3. The vehicle mobile terminal manipulation system according to claim 2, wherein:
   the conversion program is installed in each of a plurality of applications to be executed by the mobile terminal, and
   an application in which the conversion program is installed is extracted from applications registered in the mobile terminal, and displayed.

4. The vehicle mobile terminal manipulation system according to claim 1, further comprising:
   a vehicular device having a vehicle-side display portion, a vehicle-side manipulation portion being provided and corresponding to the vehicle-side display portion, and a vehicle-side communication portion that communicates with the mobile terminal, wherein:
the manipulation device is connected to the vehicular device in a state to be installed in the vehicle in advance for manipulating a vehicle-mounted device that is an equipment mounted in the vehicle; and
the vehicular device executes a switching program that switches the notification of the manipulation conducted on the manipulation device to any one of the vehicle-mounted device and the mobile terminal, and notifies the mobile terminal of the manipulation information indicative of the manipulation conducted on the manipulation device through the vehicle-side communication portion when switching the notification to the mobile terminal.

5. The vehicle mobile terminal manipulation system according to claim 1, further comprising:
a vehicular device having a vehicle-side display portion and a vehicle-side communication portion that communicates with the mobile terminal,
wherein:
the mobile terminal includes a second terminal-side communication portion that communicates with the vehicular device, and displays an operating state of the mobile terminal on the vehicle-side display portion through the second terminal-side communication portion.

6. The vehicle mobile terminal manipulation system according to claim 1, further comprising:
an audio output device,
wherein:
an operating state of the application according to the manipulation input to the manipulation device is talked back from the audio output device by voice.

7. The vehicle mobile terminal manipulation system according to claim 1, wherein:
the manipulation device includes a manipulation knob; and
the manipulation device is driven by a battery, and changes an operation resistance caused when manipulating the manipulation knob based on a charge level of the battery.

8. The vehicle mobile terminal manipulation system according to claim 1, further comprising:
an acceleration detection portion that detects acceleration,
wherein:
an orientation of the manipulation device is detected based on the acceleration detected by the acceleration detection portion.

9. The vehicle mobile terminal manipulation system according to claim 1, wherein:
each of the plurality of applications includes a conversion program;
the conversion program executes pairing between the manipulation device and an application corresponding to the conversion program, and stores as the pairing information; and
the paring information of the conversion program of the first application is taken over to the conversion program of the second application.

10. The vehicle mobile terminal manipulation system according to claim 1, wherein:
the conversion program of the second application converts the manipulation information, which is notified by the notification portion, to operation information of the second application so that the second application operates in accordance with the manipulation to the manipulation device.

11. A vehicle mobile terminal manipulation system that manipulates a mobile terminal brought in a vehicle, comprising:
a mobile terminal including a terminal-side display portion and a terminal-side manipulation portion, the mobile terminal in which a plurality of applications being registered;
a manipulation device to which a user inputs manipulation, a manipulation mode of the manipulation device being different from a manipulation mode of the terminal-side manipulation portion; and
a vehicular device including a vehicle-side display portion, a vehicle-side manipulation portion provided corresponding to the vehicle-side display portion, and a vehicle-side communication portion performing a wireless communication with the mobile terminal,
wherein:
the mobile terminal is configured to independently operate according to the manipulation conducted on the manipulation device;
the mobile terminal includes a first user interface displayed on the terminal-side display portion at a time when the mobile terminal independently operates; and
the mobile terminal generates a second user interface different from the first user interface when being connected with the vehicular device and transmits a screen display, as screen information, changing according to manipulation conducted on the manipulation device
wherein:
the manipulation device and the mobile terminal wirelessly communicate with each other by Bluetooth (registered trademark) Low Energy; and
pairing information between the manipulation device and the mobile terminal is taken over from a first application of the applications registered in the mobile terminal to a second application of the applications.

12. The vehicle mobile terminal manipulation system according to claim 11, wherein:
the mobile terminal makes a part or all of inputs of the manipulation conducted on the terminal-side manipulation portion unacceptable when being connected with the vehicular device.

13. The vehicle mobile terminal manipulation system according to claim 11, wherein:
the mobile terminal provides a user interference different depending on a difference of the manipulation mode when being connected with the vehicular device.

14. The vehicle mobile terminal manipulation system according to claim 11, wherein:
each of the plurality of applications includes a conversion program;
the conversion program executes pairing between the manipulation device and an application corresponding to the conversion program, and stores as the pairing information; and
the paring information of the conversion program of the first application is taken over to the conversion program of the second application.

* * * * *